INVENTOR
ISAAC HARTER, JR.
BY
ATTORNEY

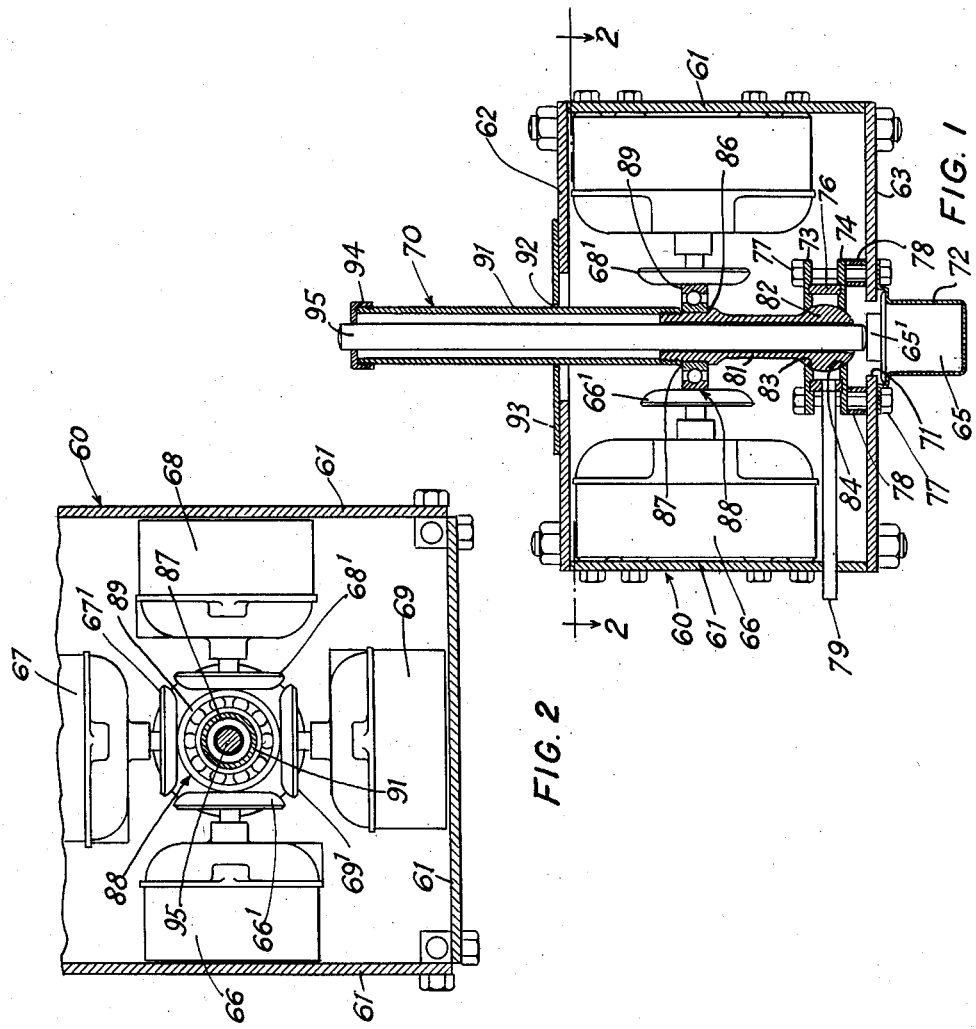

Patented Dec. 16, 1952

2,622,161

UNITED STATES PATENT OFFICE 2,622,161

MULTIPLE CIRCUIT CONTROLLER HAVING A UNIVERSALLY MOVABLE SINGLE OPERATOR

Isaac Harter, Jr., Beaver, Pa., assignor, by mesne assignments, to The Babcock & Wilcox Company, Jersey City, N. J., a corporation of New Jersey Application September 8, 1948, Serial No. 48,266

3 Claims. (Cl. 200—13)

This invention relates to controllers for manipulating apparatus and, more particularly, to a controller with a single operating member having a control movement corresponding to the desired movement of a controlled manipulator.

The invention controller is particularly applicable to manipulators of the travelling crane type. These manipulators may have up and down movements, and also lateral movements. Such movements have heretofore been controlled by separate controllers. Additionally, another control means is provided for operating the clamps, bucket, tongs, or the like for picking up and releasing the articles to be manipulated.

The invention controller is particularly designed for use where the vertical and lateral movements of a manipulator are effected by air or hydraulically operated means under the control of solenoid operated valves. These valves are selectively energized by switches controlled by the present controller. In a typical example, the controller may comprise a universally movable "joy stick" movable in any lateral direction to operate one or more of the switches controlling the solenoid valves.

For example, the "joy stick" may be pushed forward or backward to operate the "down" and "up" switches, or laterally to operate the "left" and "right" switches. Alternatively, the "joy stick" can be moved forward and to the left simultaneously, thus operating both the "down" and the "left" switches at the same time. The manipulator correspondingly moves down and swings to the left. Any other combination of movements is also possible.

A feature of the invention is a further control incorporated in the "joy stick" and which may be used to operate a switch controlling release of normally closed tongs or other article gripping means associated with a manipulator.

The controller is equally useful with electric motor operated manipulators, in which case the switches operated by the directional movement of the "joy stick" control the energization and direction of operation of positioning motors.

It is accordingly among the objects of this invention to provide a novel controller for manipulators, having a control movement corresponding to the desired manipulating movement.

Another object is to provide a controller arranged to simultaneously control one or more of a plurality of electric circuits.

A still further object is to provide a rugged, simple and inexpensive controller for a plurality of electric circuits.

These and other objects, advantages and novel features of the invention will be apparent from the following description and the accompanying drawings.

In the drawings:

Fig. 1 is a central vertical sectional view through the controller;

Fig. 2 is a horizontal sectional view of the controller, taken on the line 2—2 of Fig. 1;

Figure 3:
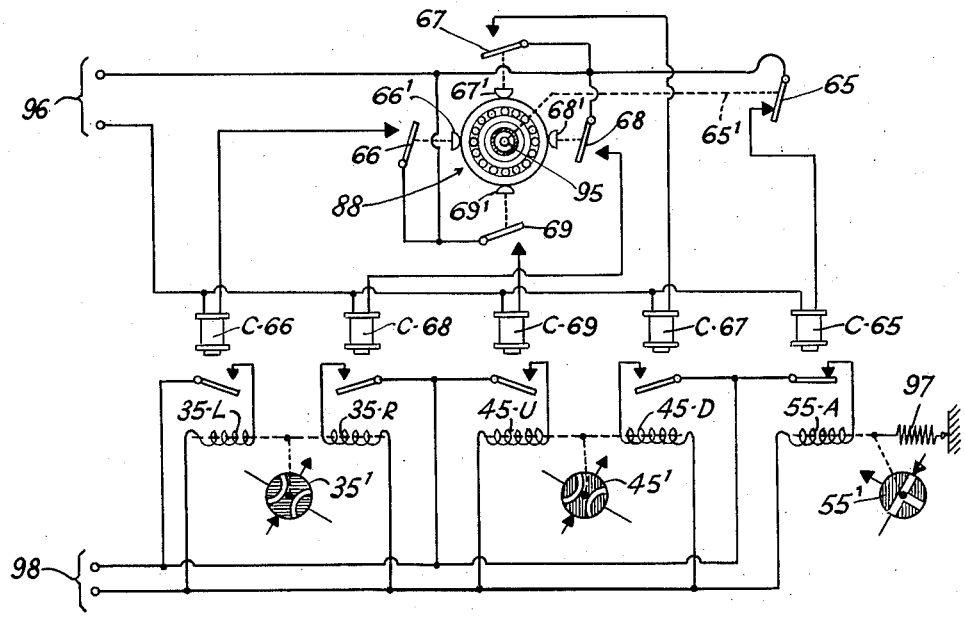
Fig. 3 is a schematic circuit diagram illustrating the controller as applied to control the solenoid valves of an air or hydraulically operated manipulator.

Referring now to Figs. 1 and 2, controller 10 is illustrated as including a casing or housing 60 having side walls 61 and centrally apertured top and bottom walls 62, 63. While shown as rectangular or cubical, casing or housing 60 may be made in any desired shape in accordance with the desired control movements.

In the particular arrangement chosen to illustrate the invention principles, controller 10 includes five switches 65, 66, 67, 68 and 69. Switch 65 is centrally aligned with an aperture 71 in bottom wall 63, and is supported in a bracket or casing 72. Its operating button 65' projects into aperture 71.

The other four switches 66—69 are mounted on the side walls 61 so that their operating buttons 66'—69' project toward the center of housing 60. These operating buttons are of the enlarged head type providing for easy and simple operating by striking with the palm of the hand.

In alignment with aperture 71, a universal bearing socket is mounted on wall 63 within housing 60 and includes spaced upper and lower plates 73, 74 interfitting with an annular side wall 76. The assembly is held together by bolts 77 secured to wall 63 and surrounded by spacers 78 supporting the bearing socket above wall 63. A pressure lubrication tube 79 may extend through a side wall 61 and annular wall 76 into the bearing socket.

The operating handle 79 of controller 10 includes an elongated, generally tubular base member 81 having a spherical enlargement 82 at its lower end, and this enlargement has bearing engagement in central apertures 83, 84 in plates 73, 74. The edges of apertures 83, 84 are hollowed to provide substantially spherical surfaces engaging enlargement 82, and member 81 is engaged between plates 73, 74 before the latter are assembled with wall 76 to form the bearing socket.

Near its upper end, member 81 has a shoulder 86 against which is set the inner race 87 of a ball bearing assembly 88. The outer race 89 engages the switch operators 66'—69'. Race 87 is clamped against shoulder 86 by a tubular sleeve 91 threaded onto the upper end of member 81 and extending through a central aperture 92 in a cover plate 93 resting on top plate 62. Cover plate 93 is not attached to top plate 62 but slides freely thereover as operating handle 70 is moved laterally.

An apertured cap 94 is threaded on the outer end of sleeve 91 and serves as an outer guide for a rod 95 extending through sleeve 91 and member 81 into engagement with the operator 65' of switch 65. Through the medium of its ball and socket mounting and roller bearing assembly 88, operating handle 70 is universally swingable to depress the operator of any one or more of switches 66—69. Switch 65 is operated by pressing the outer end of rod 95.

Thus, and referring to Fig. 2, if switches 67 and 69 are the "down" and "up" switches, respectively, and switches 66 and 68 the "left" and "right" switches, respectively, the operator pushes handle 70 forwardly for "down," pulls it rearwardly for "up," and pushes it left or right for "left" or "right." Switch 65 may control tongs or other article gripping means, with the tongs being normally closed until switch 65 is operated. The operator must therefore consciously depress rod 95 to open the tongs. With such arrangement, a "dead man" safety control of the tongs is effected.

Figure 4:
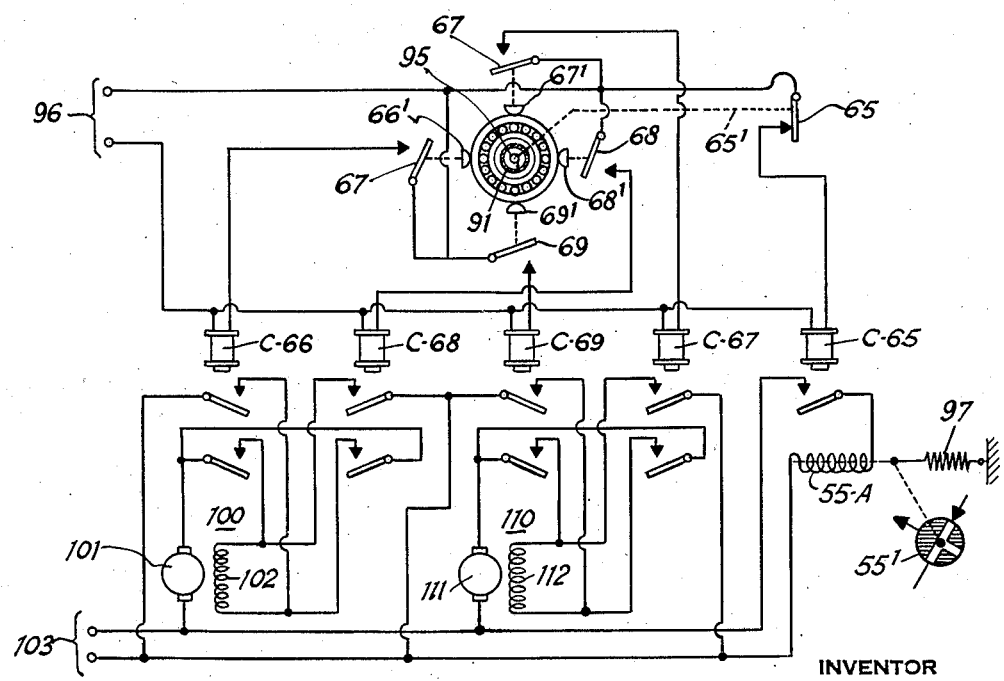
Fig. 4 is a schematic circuit diagram illustrating the controller as applied to the control of a pair of reversible electric motors and an air motor.

Figs. 3 and 4 illustrate typical control circuits for controller 10. The switches 65—69 and the elements of controller 10 have been designated by the same reference characters as in Figs. 1 and 2.

In the circuit of Fig. 3, one terminal of a source of control potential 96 is connected in parallel to each switch 65—69. The other source terminal is connected in parallel to one terminal of each of five control relays C65—C69, each having its other terminal connected to the correspondingly numbered switch. A solenoid operated valve 35', 45' or 55' respectively controls the operation of the means effecting lateral movement, vertical movement, and release of the tongs or the like. The arrows pointing toward each valve indicate connections to a source of fluid pressure, and the arrows pointing away from each valve indicate exhaust connections.

Valves 35' and 45' are four-way valves arranged to apply fluid pressure to either end of cylinders or other means controlling lateral and vertical movement respectively. The arrangement is such that the cylinders remain in an operated position until a further control movement is effected. Thus, each of these valves are indicated as having two fluid pressure lines connected to the respective cylinders.

On the other hand, valve 55' is a three-way valve arranged to connect one end of a cylinder or the like, operating the article gripping means, either to a pump or to exhaust. A spring 97 is indicated as biasing valve 55' toward the exhaust position connecting its single cylinder line to the exhaust line.

Valves 35' and 45' are operated by pairs of solenoids indicated at 35L, 35R, 45U and 45D, respectively for "left," "right," "up" and "down" operation. A solenoid 55A is indicated as opposing the action of spring 97. Each solenoid is connectable across a source of power 98 by the front contact and armature of its associated relay, with relay C65 being normally energized through normally closed switch 65 to energize solenoid 55A. Thus, the tongs remain closed until rod 95 is consciously depressed to open switch 65.

To pick up an article in advance of the manipulator tongs or grip, rod 95 is depressed and handle 70 pushed forwardly. Rod 95 opens switch 65, dropping relay C65 to deenergize solenoid 55A. Spring 97 turns valve 55' clockwise, connecting cylinder 55 to exhaust, and the tongs open. Rod 95 closes switch 67 through bearing assembly 88 and switch operator 67'. This picks up relay C67 to energize solenoid 45D to operate valve 45' to apply pressure to the vertical movement operating means to lower the article gripping means.

To align the tongs over an article, handle 70 may be moved either left or right to close either switch 66 or switch 68. When the tongs engage the article, rod 95 is released to permit switch 65 to close. This picks up relay C65 to energize solenoid 55A and move valve 55' counterclockwise to connect the tongs operating cylinder to pressure and thus clamp the tongs about the article. The article remains clamped in the tongs until rod 95 is again depressed.

Handle 70 is then pulled back to close switch 69 to raise the article. Rod 95 is again depressed to open the tongs to release the article.

It will be noted that, through bearing assembly 88, handle 70 may be moved diagonally to operate any two adjacent switches 66—69 to produce a combined up-down and left-right movement.

Fig. 4 illustrates controller 10 as applied to control a pair of crane motors for up-down and left-right movement of the crane hook or tongs. In so far as the connections of the controller to relays C65—C69, and the circuits of solenoid 55A of valve 55' are concerned, these are the same as in Fig. 3. Relays C66—C69 have both an upper and a lower armature, and are connected to act as reversing switches in a manner well known to those skilled in the art. The left-right motor is indicated at 100 as comprising an armature 101 and a field 102. Similarly the up-down or hoist motor is indicated at 110 as having an armature 111 and a field 112. One terminal of each motor armature is constantly connected to one side of source 103, and the other source terminal is connected to the upper armatures of the relays. The other terminal of each motor armature is connected to the lower armature of each of its associated relays. One terminal of each field winding is connected to an upper front contact of one relay and a lower front contact of the other relay. The other field terminal is connected to the front contacts in reverse order.

Consequently, when relay C66, for example, is picked up, the connections of motor 100 are such that the crane moves to the left. Picking up relay C68, reverses the connections of field 102 to reverse motor 100. A similar operation takes place with hoist motor 110 when relays C69 and C67 are selectively picked up. Each relay is energized in response to a corresponding up-down, left-right or combined up-down-left-right movement of handle 70.

The described controller is a simple and effective means for effecting complex movements of a manipulator. The handle 70 is moved in a direction corresponding to the desired movement in much the same way as is the control or "joy stick" of an airplane. Rod 95 cooperating with switch 65 provides an effective "dead man" control of the article gripping means.

While specific embodiments of the invention have been shown and described in detail to illustrate the application of the invention principles, it will be understood that the invention may be otherwise embodied without departing from such principles.

What I claim is:

1. A circuit controller comprising, in combination, a base; a frame secured to said base; a universal bearing socket mounted substantially centrally on said base; an elongated base member having a spherical enlargement at one end engaged in said socket; an anti-friction bearing assembly embracing said member and having an inner race secured on said base member; a plurality of switches mounted on said frame in substantially the plane of said assembly, said switches having operators extending inwardly toward and continuously engaging the outer race of said assembly; and a handle secured to the other end of said member for universal movement of said base member to selectively actuate said switches through movement of said assembly.

2. A circuit controller comprising, in combination, a base; an enclosure secured to said base; a centrally apertured cover secured to said enclosure; a universal bearing socket mounted substantially centrally on said base; an elongated base member having a spherical enlargement at one end engaged in said socket, and a shoulder intermediate its ends; an antifriction bearing assembly embracing said member and having an inner race engaging said shoulder; a plurality of switches mounted on the inner surface of said enclosure in substantially the plane of said assembly, said switches having operators extending inwardly toward and continuously engaging the outer race of said assembly; and a handle secured to the other end of said member and extending through the cover aperture for universal movement of said base member to selectively actuate said switches through movement of said assembly.

3. A circuit controller comprising, in combination, a centrally apertured base; an enclosure secured to said base; a centrally apertured cover secured to said enclosure; a universal bearing socket mounted substantially centrally on said base; a substantially tubular base member having a spherical enlargement at one end engaged in said socket, and a shoulder intermediate its ends; an anti-friction bearing assembly embracing said member and having an inner race engaging said shoulder; a plurality of switches mounted on the inner surface of said enclosure in substantially the plane of said assembly, said switches having operators extending inwardly toward and continuously engaging the outer race of said assembly; a tubular handle secured to the other end of said member in alignment therewith and extending through the cover aperture for universal movement of said base member to selectively actuate said switches through movement of said assembly; a switch secured to the underside of said base and having an operator extending into the base aperture in substantial alignment with said base member; and a rod telescoped through said base member and handle, extending beyond the latter, with its inner end engaged with such last named operator; whereby the last named switch may be selectively operated by depressing the projecting end of said rod.

ISAAC HARTER, JR.

REFERENCES CITED

The following references are of record in the file of this patent:

UNITED STATES PATENTS

| Number | Name | Date |
| --- | --- | --- |
| 112,829 | Middleton | May 21, 1871 |
| 612,413 | Guernsey | Oct. 18, 1898 |
| 1,709,068 | Forseille | Apr. 16, 1929 |
| 1,729,891 | Moore | Oct. 1, 1929 |
| 2,391,881 | Clay | Jan. 1, 1946 |
| 2,397,978 | Paulus | Apr. 9, 1946 |

FOREIGN PATENTS

| Number | Country | Date |
| --- | --- | --- |
| 638,312 | France | Feb. 20, 1928 |